United States Patent [19]
Eisen et al.

[11] Patent Number: 5,790,445
[45] Date of Patent: Aug. 4, 1998

[54] METHOD AND SYSTEM FOR PERFORMING A HIGH SPEED FLOATING POINT ADD OPERATION

[75] Inventors: Lee Evan Eisen; Timothy Alan Elliott, both of Austin; Robert Thaddeus Golla, Plano; Christopher Hans Olson, Austin, all of Tex.

[73] Assignee: International Business Machines Corporation, Armonk, N.Y.

[21] Appl. No.: 641,307

[22] Filed: Apr. 30, 1996

[51] Int. Cl.⁶ .................................................. G06F 7/38
[52] U.S. Cl. ........................................................ 364/748.11
[58] Field of Search ................... 364/715.04, 748.01, 364/748.07, 748.11, 748.13

[56] References Cited

U.S. PATENT DOCUMENTS

| | | | |
|---|---|---|---|
| 4,488,252 | 12/1984 | Vassar | 364/748 |
| 4,660,143 | 4/1987 | King et al. | 364/748 X |
| 4,866,651 | 9/1989 | Bleher et al. | 364/748 |
| 4,926,370 | 5/1990 | Brown et al. | 364/748 |
| 4,945,505 | 7/1990 | Wiener et al. | 364/715.03 |
| 4,999,803 | 3/1991 | Turrini et al. | 364/748 |
| 5,202,972 | 4/1993 | Gusefski et al. | 395/425 |
| 5,241,493 | 8/1993 | Chu et al. | 364/748 |
| 5,253,195 | 10/1993 | Broker et al. | 364/760 X |
| 5,257,215 | 10/1993 | Poon | 364/745 |
| 5,333,287 | 7/1994 | Buerkle et al. | 395/375 |
| 5,341,319 | 8/1994 | Madden et al. | 364/748 |
| 5,341,321 | 8/1994 | Karp et al. | 364/748 |
| 5,369,607 | 11/1994 | Okamoto | 364/748.11 |

FOREIGN PATENT DOCUMENTS

| | | |
|---|---|---|
| 596175A1 | 11/1992 | European Pat. Off. |
| 645699A1 | 9/1993 | European Pat. Off. |
| 3218518 | 9/1991 | Japan . |

OTHER PUBLICATIONS

Jones, F.B.; and Wymore, A. W.; IBM Technical Disclosure Bulletin, *Floating Point Feature on the IBM Type 1620*, vol. 4 No. 12, May 1962.

Sproul, W., IBM Technical Disclosure Bulletin, *High Speed Floating–Point Accumulator*, vol.4 No.10, Mar. 1972.

IBM Technical Disclosure Bulletin, *Floating Point Exception Handling (Denormalization)*, vol. 33 No.9, Feb. 1991.

IBM Technical Disclosure Bulletin, *Floating Point 2:1 High Level Design*, vol. 34 No.3B, Dec. 1991.

IBM Technical Disclosure Bulletin, *Single Cycle/Writeback Cycle floating Point Denormaliztion*, vol. 37 No. 04B, Apr. 1994.

IBM Technical Disclosure Bulletin, *Floating Point Convert to Integer Improved Implementation*, vol. 37 No.07, Jul. 1994.

IBM Technical Disclosure Bulletin, *Floating Point Bypass Dataflow*, vol. No. 09, Sep. 1994.

*Primary Examiner*—Chuong Dinh Ngo
*Attorney, Agent, or Firm*—Sawyer & Associates; Casimer K. Salys

[57] ABSTRACT

A system and method for calculating a floating point add/subtract of a plurality of floating point operands is disclosed. The system comprises at least one pair of data paths. Each pair of data paths comprises a first data path and a second data path. The first data path includes a first aligner, a first adder coupled to the first aligner, and a first normalizer coupled to the first adder. The first normalizer is capable of shifting a mantissa by a substantially smaller number of digits than the first aligner. The second data path comprises control logic, a second aligner coupled to the control logic, a second adder coupled to the second aligner, and a second normalizer coupled to the second adder. The control logic provides a control signal that is responsive to a first predetermined number of digits of each exponent of a pair of exponents. The pair of exponents are the exponents for a pair of inputs to the second data path. The second aligner is responsive to the control signal provided by the control logic. In addition, the second normalizer is capable of shifting a mantissa by a substantially larger number of digits than the second aligner.

26 Claims, 4 Drawing Sheets

5,790,445

METHOD AND SYSTEM FOR PERFORMING A HIGH SPEED FLOATING POINT ADD OPERATION

FIELD OF THE INVENTION

The present invention relates to mathematical operations on floating point numbers, and more particularly to a method and system for performing a high speed add operation.

BACKGROUND OF THE INVENTION

Floating point numbers are comprised of a digit and a decimal point followed by a certain number of significant digits, for example 52, multiplied by 2 to a power. In the context of this application, a significant digit represents a bit position. For example, a floating point number can be expressed as $(1.10110...)*(2^x)$. Consequently, floating point numbers are represented by a mantissa and an exponent. A mantissa is the digit and decimal point followed by the significant digits. Therefore, the mantissa typically has a total of 53 significant digits. The exponent is the power to which 2 is taken.

Mathematical operations on floating point numbers can be carried out by a computer. One such operation is the add operation. An add operation performs the calculation Ra+Rb, where Ra and Rb are floating point operands. In addition, in the context of this application, a plus sign stands for either an addition or a subtraction. The mantissa of Ra is A, and the mantissa of Rb is B. A conventional floating point add operation equalizes the exponents of the Ra and Rb, then aligns A and B. The aligned A and B are then combined. After the mantissas are combined to provide a resultant, the resultant is normalized to remove any leading zeroes. Finally, the normalized resultant is rounded.

Normalization and alignment typically take place in shifters. Because the A and B may be offset by any number of digits, the shifters which align A and B, and the shifters which normalize the resultant must be very wide. Typically, for a 53 bit mantissa, these shifters are on the order of 53 digits wide. In general, the wider the shifter used, the more significant the delay introduced. Thus, the use of two wide shifters in a conventional add operation significantly slows the calculation and reduces data flow rates.

Accordingly, what is needed is a system and method for performing an add operation at higher speeds. The present invention addresses such a need.

SUMMARY OF THE INVENTION

The present invention provides a method and system for calculating a floating point add/subtract of a plurality of floating point operands. The system comprises at least one pair of data paths. The at least one pair of data paths comprises a first data path and a second data path. The first data path includes a first aligner, a first adder coupled to the first aligner, and a first normalizer coupled to the first adder. The first normalizer is capable of shifting a mantissa by a substantially smaller number of digits than the first aligner. The second data path comprises control logic, a second aligner coupled to the control logic, a second adder coupled to the second aligner, and a second normalizer coupled to the second adder. The control logic provides a control signal that is responsive to a first predetermined number of digits of each exponent of a pair of exponents. The pair of exponents are the exponents for a pair of inputs to the second data path. The second aligner is responsive to the control signal provided by the control logic. The second normalizer is capable of shifting a mantissa by a substantially larger number of digits than the second aligner.

According to the system and method disclosed herein, the present invention has increased data flow rates and higher speed, thereby increasing overall system performance.

DESCRIPTION OF THE INVENTION

The present invention relates to an improvement in the speed of a floating point add operation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention not intended to be limited to the embodiment shown but is to be accorded the widest scope consistent with the principles and features described herein.

Figure 1:
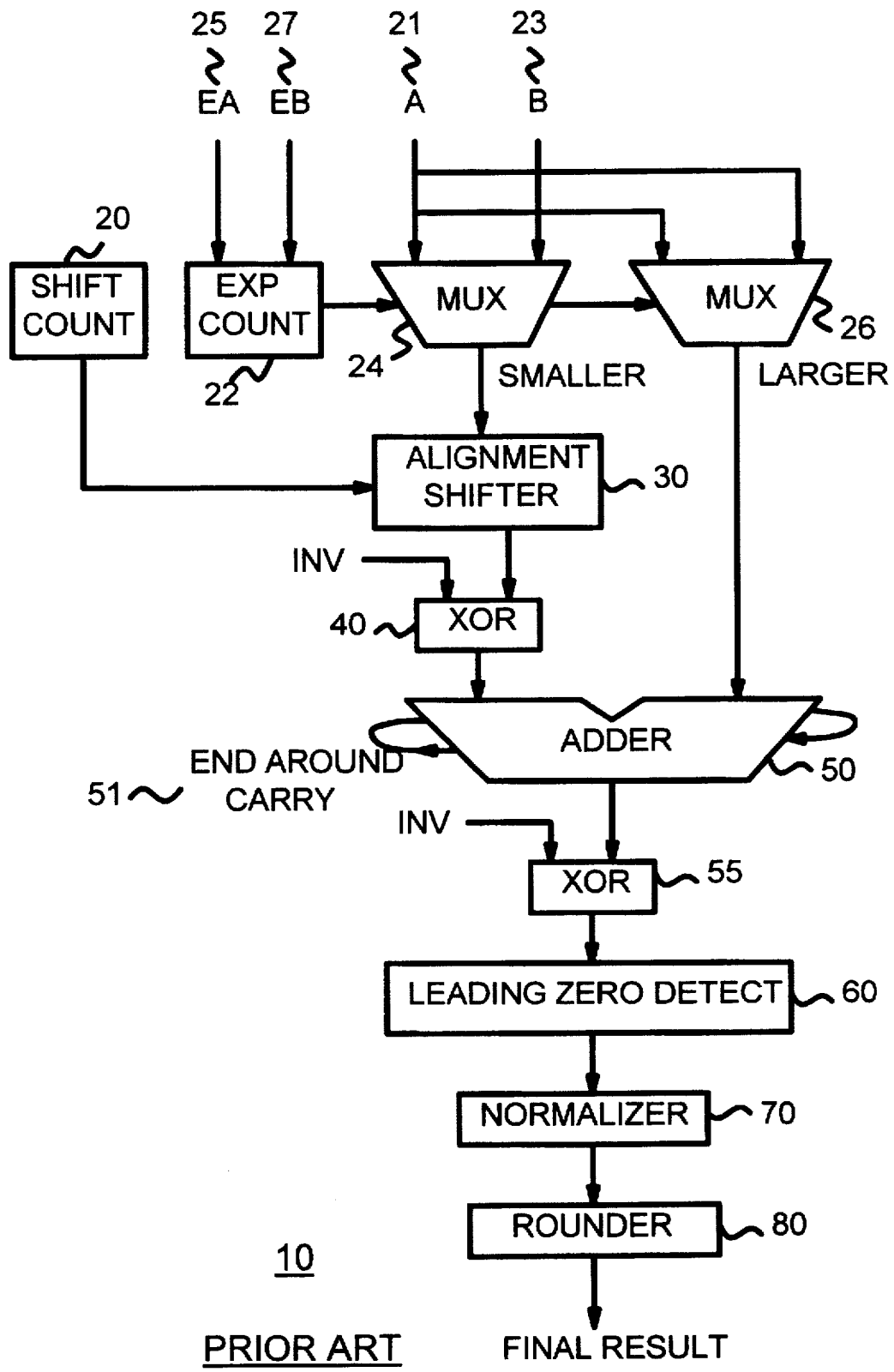
FIG. 1 is a flow chart of a conventional add data flow.

FIG. 1 is a flow chart of how a conventional add operation is performed. As previously stated, in the context of this application, an add is defined to be either an add or a subtract. In this embodiment, it is assumed that the mantissas are each 53 bits wide. FIG. 1 shows the conventional add operation 10 having four inputs. Two inputs of conventional add operation 10 are the mantissas A 21 and B 23 of operands Ra and Rb, respectively. The remaining two inputs are exponents EA 25 and EB 27 of operands Ra and Rb, respectively. Operands Ra and Rb are floating point numbers.

In order to add Ra to Rb, the exponents EA 25 and EB 27 must be equalized and the mantissas aligned. In order to align A 21 and B 23, exponent compare 22 determines whether EA or EB is larger. Exponent compare 22, multiplexer (MUX) 24 and MUX 26 send the mantissa corresponding to the smaller of EA 25 and EB 27 to alignment shifter 30. Thus, MUX 24 chooses A 21 to input to alignment shifter 30 when EA 25 is smaller than EB 27, and chooses B 23 to input to alignment shifter 20 when EB 27 is smaller than EA 25. MUX 26 routes A 21 directly to adder 50 when EA 25 is larger than EB 27, but routes B 23 directly to adder 50 when EB 27 is larger than EA 25.

Shift count 20 counts the number of digits by which the exponents EA 25 and EB 27 differ. This difference is the number of places A 21 or B 23 must be shifted right. Shift count 20 inputs this number to alignment shifter 30. Alignment shifter 30 then shifts A 21 or B 23 the appropriate number of digits right. Thus, the mantissa of the smaller of Ra and Rb is aligned to the mantissa of the larger. Because EA 25 and EB 27 may differ by any amount, the logic for controlling MUX 24 and MUX 26 must take into account all the digits of EA 25 and EB.

In typical adders, A 21 and B 23 are 53 bits wide. Consequently, to align A 21 and B 23, alignment shifter 30 is typically about 55 bits wide. The wider the shifter, the bigger the delay that is added to the data flow. Thus, alignment shifter 30 significantly slows the data flow.

The aligned A 21 and B 23 are then input to adder 50, which carries out the operation A 21+B 23. As previously stated, a+denotes either an add or a subtract in the context of this application. Leading zeroes in the mantissa of the resultant are detected by leading zero detect 60, and the resultant input to normalizer 70. Normalizer 70 shifts the mantissa of the resultant left to remove any leading zeroes. Normalizer 70 must also be a wide shifter because if A 21 is nearly equal to B 23, there is a possibility of a large number of leading zeroes. In the typical embodiments, for example, normalizer 70 is approximately 55 bits wide. Consequently, normalizer 70 also adds a significant delay to the data flow. Finally, rounder 80 rounds the normalized resultant to 53 significant digits.

Although the conventional add operation 10 shown in FIG. 1 can perform an add operation, those with ordinary skill in the art will realize that alignment shifter 30 and normalizer 80 contribute significant delays to the data flow. In addition, the logic controlling MUX 24 and MUX 26 must be somewhat complex in order to take into account all the digits of EA 25 and EB 27.

The present invention provides for a method and system for a high speed add operation. The present invention will be described in terms of a flow chart containing the major elements in the data flow. Thus, some elements which are consistent with conventional approaches will not be described. In addition, the element sizes specified are for the particular embodiment disclosed and should not be construed to limit the method and system. Thus, one of ordinary skill in the art will readily recognize that this method and system will operate effectively for other types and sizes of elements. In the context of this application, an add operation is defined to be either an add or a subtract.

Figure 2:
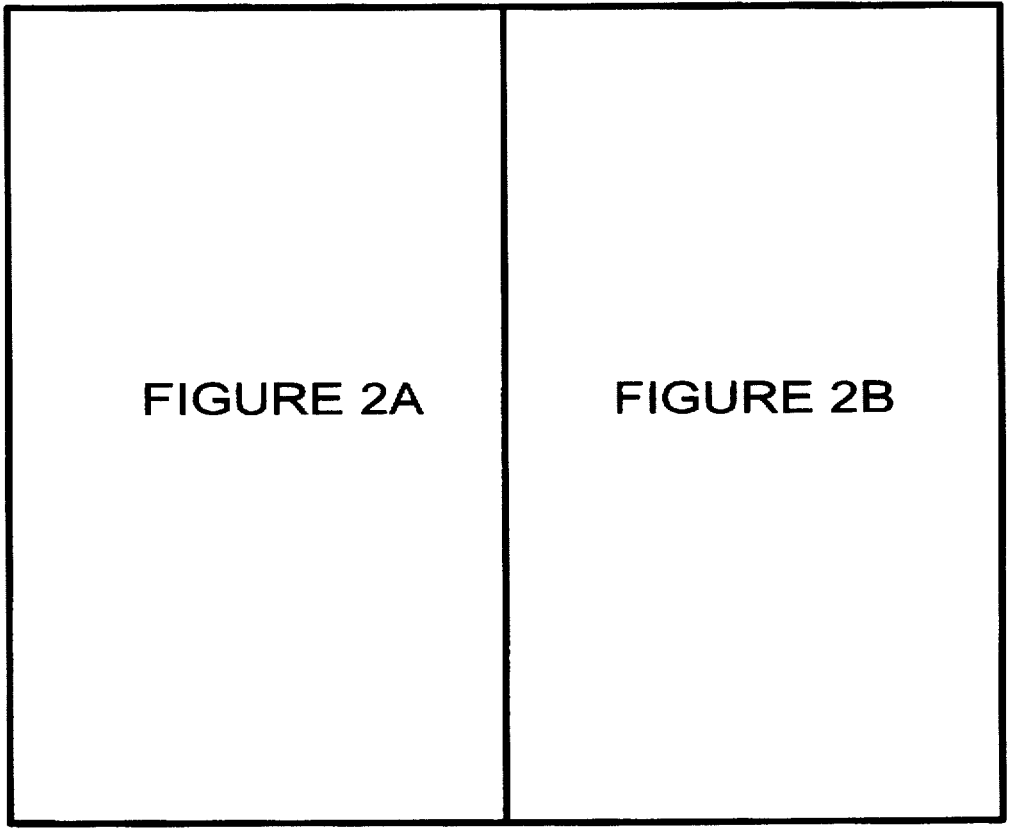
FIG. 2 is a flow chart depicting an embodiment of the faster add data flow in accordance with the present invention.
Figure 2A:
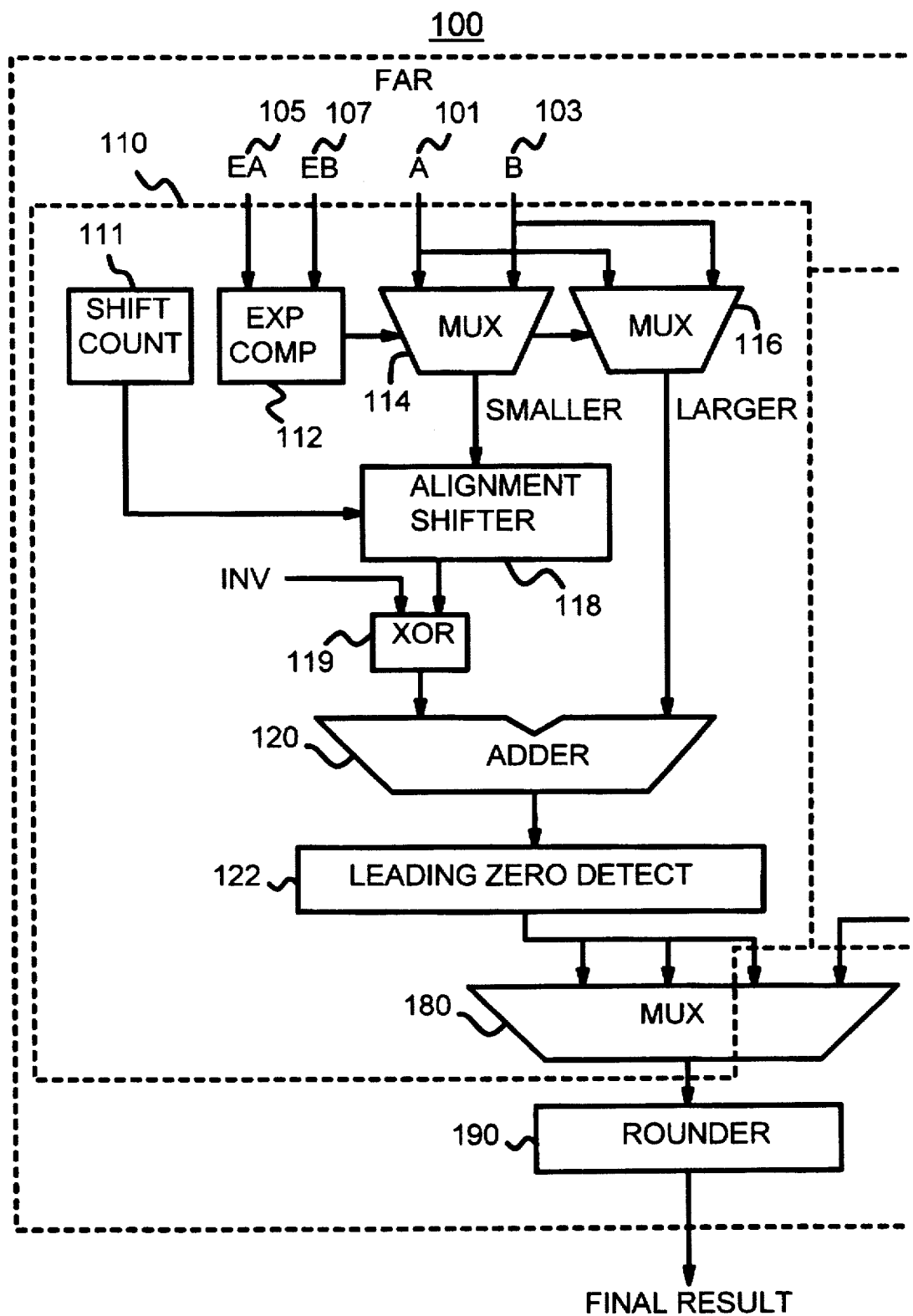
Figure 2B:
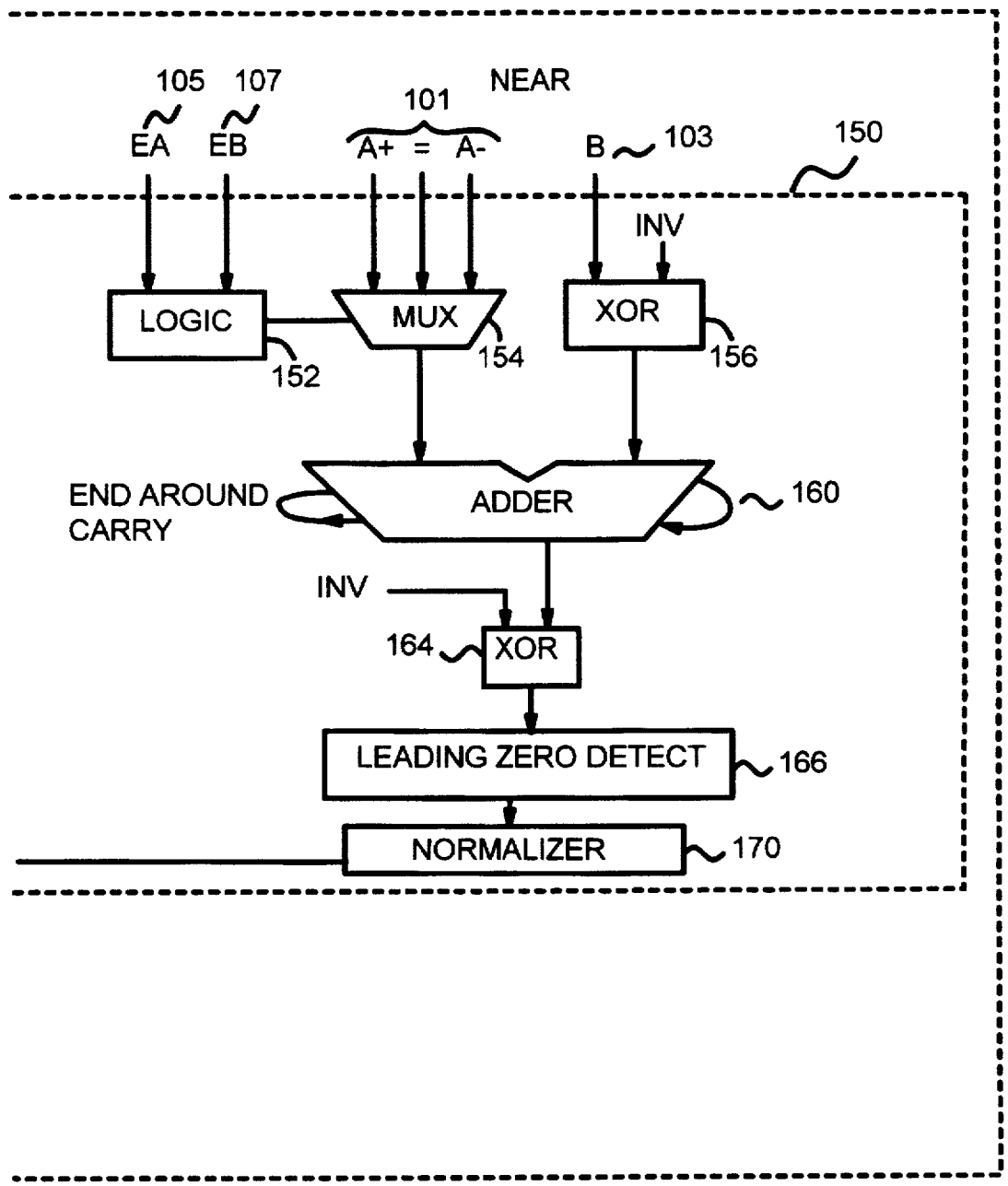

To more particularly illustrate the high speed add operation in accordance with the present invention, refer now to FIG. 2, depicting a flow chart of one embodiment of such a system.

The data flow of the add operation 100 of the present invention includes two separate data paths: FAR path 110 and NEAR path 150. A 101 is the mantissa of Ra, B 103 is the mantissa of Rb. EA 105 is the exponent of Ra, and EB 107 is the exponent of Rb. Ra and Rb are the floating point operands. In the preferred embodiment, A 101 and B 103 are 53 bits.

In the present embodiment, if Ra and Rb are more than one digit apart, the resultant from FAR data path 110 is used. Exponent compare 112 determine whether Ra or Rb is larger by comparing EA 105 to EB 107. In this embodiment, the mantissa of the smaller input is aligned to the mantissa of the larger, through alignment shifter 118. Thus, MUX 114 passes A 101 to alignment shifter 118 when EA 105 is less than EB 107, but passes B 103 to alignment shifter 118 when EB 107 is less than EA 105. Similarly, MUX 116 passes A 101 directly to adder 120 when EA 105 is greater than EB 107, and passes B 103 directly to adder 120 when EB 107 is greater than EA 105.

Shift count 111 determines the number of places the mantissa of the smaller operand must be shifted. This number is input to alignment shifter 118. Alignment shifter 118 then shifts A 101 or B 103 the appropriate number of digits right. Aligned A 101 and B 103 are then combined by adder 120.

Because Ra and Rb are greater than one digit apart, there can be no more than one leading zero in the resultant A 101+B 103. Thus, in this embodiment, leading zero detect 122 is a one bit leading zero detector. MUX 180 normalizes the resultant of the FAR data path 100 instead of a slower, wide shifter. In the present embodiment, MUX 180 performs other operations in addition to normalization in FAR data path 120. However, the functions of MUX 180 may be split into different elements. Thus, the normalizing function may be carried out by an element other than a MUX.

In this embodiment, alignment shifter 118 is capable of shifting a mantissa by a number of digits that is on the order of an operand: 55 digits. MUX 180, however, can shift a mantissa by significantly fewer digits than the width of an operand. Alignment shifter 118 is, therefore, capable of shifting a mantissa by a larger number of digits than MUX 180. Thus, only one wide shifter, alignment shifter 118, is used in FAR data path 100. Consequently, the delay in the add operation is significantly reduced.

Note that FAR data path 110 differs from conventional add operation 10 of FIG. 1 in two other respects. Referring now to FIG. 1, main adder end around carry 51 and output XOR 55 have been removed. Referring now to FIG. 2, this has been accomplished by aligning the smaller operand to the larger and inverting the smaller operand at XOR 119. Note that by only subtracting the smaller operand from the larger one, the resultant is guaranteed to be positive for either an addition or subtraction operation carried out by adder 120.

In the present embodiment, if Ra and Rb are less than one digit apart, the resultant of NEAR data path 150 is used. Because Ra is within one digit of Rb, A 101 is aligned using MUX 154. Thus, for this embodiment, MUX 154 is a 3-1 MUX. Referring to FIG. 2, MUX 154 has as inputs A 101 shifted one bit left ("A+), A 101 unshifted (=), and A 101 shifted one bit right (A−). Depending on whether Ra is one digit right of Rb, one digit left of Rb, or at the same digit as Rb, MUX 154 chooses one of the three inputs.

The logic for controlling MUX 154 is significantly simpler than the logic controlling MUXs 24 and 26 of conventional add operation 10. In particular, because Ra and Rb are within one digit of each other, only two digits of exponents EA 105 and EB 107 must be retained in order to properly control MUX 154. Table 1 shows the logic for controlling which of its three inputs MUX 154 chooses. In Table 1,+is A 101 shifted one bit right,=is A 101 unshifted,−is A 101 shifted one bit left, and X is a situation not found in NEAR data path 150.

TABLE 1

| EA | EB | MUX 154 SELECT |
| --- | --- | --- |
| 00 | 00 | = |
| 00 | 01 | − |
| 00 | 10 | X |
| 00 | 11 | + |
| 01 | 00 | + |
| 01 | 01 | = |
| 01 | 10 | − |
| 01 | 11 | X |
| 10 | 00 | X |
| 10 | 01 | + |
| 10 | 10 | = |
| 10 | 11 | − |
| 11 | 00 | − |
| 11 | 01 | X |
| 11 | 10 | + |
| 11 | 11 | = |

Adder 160 combines the two mantissas after A 101 is aligned to B 103. Leading zero detect 166 then searches for leading zeroes in the resultant A 101+B 103. Because Ra and Rb are within one digit of each other, there can be mass cancellation in a subtraction operation. Thus, leading zero detect 166 of the present embodiment can detect a number of leading zeroes on the order of the width of a mantissa (53 digits).

Normalizer 170 then fully normalizes the resultant by shifting the resultant left. Because mass cancellation can occur, normalizer 170 must be capable of shifting a mantissa by a number of digits that is on the order of an operand. In the present embodiment, normalizer 170 is 53 bits wide. MUX 154 of the present embodiment, however, can only shift a mantissa by one digit right or left. Consequently, normalizer 170 is capable of shifting a mantissa by a number of digits that is significantly larger than MUX 154. Normalizer 170 is, therefore, the only wide shifter in NEAR data path 150. In addition, the control logic for MUX 154 is simplified. Thus, delays are significantly reduced in the NEAR data path 150.

In the present embodiment, NEAR and FAR data paths 150 and 110, respectively, use common MUX 180 and common rounder 190. Therefore, in the present embodiment, MUX 180 not only normalizes the resultant of FAR data path 110, but also outputs the resultant of FAR data path 110 or NEAR data path 150 depending on how many digits apart Ra and Rb are. Rounder 190 outputs the 53 bit final result.

NEAR data path 150 and FAR data path 110 each contain only one component capable of shifting a mantissa by a large number of digits. Thus, only one wide shifter is present in each data path In addition, the logic controlling the alignment of the mantissas in NEAR data path 150 is simplified. Consequently, the speed of the calculation of Ra+Rb is increased.

A method and system has been disclosed for a high speed add operation. In the method and system, the data flow passes through only one wide shifter. In addition, logic for controlling alignment in one data path has been simplified. This combination increases the speed of the add calculation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for calculating a floating point add/subtract of a plurality of operands comprising:
   at least one pair of data paths, the at least one pair of data paths comprising a first data path and a second data path,
   the first data path further comprising
      a first aligner;
      a first adder coupled to the first aligner; and
      a first normalizer coupled to the first adder, the first normalizer being capable of shifting a mantissa by a substantially smaller number of digits than the first aligner;
   the second data path further comprising
      control logic for providing a control signal, the control signal being responsive to two digits of each exponent of a pair of exponents, the pair of exponents being the exponents for a pair of inputs to the second data path;
      a second aligner coupled to the control logic, the second aligner being responsive to the control signal provided by the control logic;
      a second adder coupled to the second aligner; and
      a second normalizer coupled to the second adder, the second normalizer being capable of shifting a mantissa by a substantially larger number of digits than the second aligner.

2. The system of claim 1 wherein in each pair of data paths, the first normalizer provides a normalized first resultant; and the second normalizer provides a normalized second resultant.

3. The system of claim 2 further comprising:
   at least one chooser, each chooser being coupled to the first data path and the second data path of a corresponding pair of data paths, each chooser providing a resultant, the resultant being the normalized first resultant of the corresponding pair of data paths when a pair of inputs to the corresponding pair of data paths are more than a first predetermined number of digits apart, and the resultant being the normalized second resultant of the corresponding pair of data paths when the pair of inputs to the corresponding pair of data paths are no more than the first predetermined number of digits apart.

4. The system of claim 3 wherein the first predetermined number of digits is one digit.

5. The system of claim 3 wherein each chooser further comprises a multiplexer.

6. The system of claim 3 wherein each chooser and each first normalizer of the corresponding pair of data paths comprise a single multiplexer.

7. The system of claim 1 wherein the second aligner further comprises a multiplexer for receiving a first input of the pair of inputs, the first input shifted right by one digit, and the first input shifted left by one digit, the multiplexer choosing one of the first input, the first input shifted right, and the first input shifted left in response to the control signal.

8. The system of claim 1 wherein each first data path further comprises a comparer coupled to the first aligner, each comparer for comparing a pair of inputs to the first data path and providing the mantissa of the smaller of the inputs to the first aligner.

9. A system for calculating a floating point add/subtract of a pair of operands comprising:
   a first data path and a second data path,
   the first data path further comprising
      a first aligner;
      a first adder coupled to the first aligner; and
      a first normalizer coupled to the first adder, the first normalizer being capable of shifting a mantissa by a substantially smaller number of digits than the first aligner;
   the second data path further comprising
      control logic for providing a control signal, the control signal being responsive to two digits of each exponent of a pair of exponents, the pair of exponents being the exponents for the pair of operands;
      a second aligner coupled to the control logic, the second aligner being responsive to the control signal provided by the control logic;
      a second adder coupled to the second aligner; and
      a second normalizer coupled to the second adder, the second normalizer being capable of shifting a mantissa by a substantially larger number of digits than the second aligner.

10. The system of claim 9 wherein in the first normalizer provides a normalized first resultant; and the second normalizer provides a normalized second resultant.

11. The system of claim 10 further comprising: a chooser coupled to the first data path and the second data path of a corresponding pair of data paths, the chooser for providing a resultant, the resultant being the normalized first resultant when the pair of operands are more than a first predetermined number of digits apart, and the resultant being the normalized second resultant when the pair of inputs to the corresponding pair of data paths are no more than the first predetermined number of digits apart.

12. The system of claim 11 wherein the first predetermined number of digits is one digit.

13. The system of claim 11 wherein the chooser further comprises a multiplexer.

14. The system of claim 11 wherein the chooser and the first normalizer comprise a single multiplexer.

15. The system of claim 9 wherein the second aligner further comprises a multiplexer for receiving a first operand of the pair of operands, the first operand shifted right by one digit, and the first operand shifted left by one digit, the multiplexer choosing one of the first operand, the first operand shifted right, and the first operand shifted left in response to the control signal.

16. The system of claim 9 wherein the first data path further comprises a comparer coupled to the first aligner, the comparer for comparing a the operands and providing the mantissa of the smaller of the operands to the first aligner.

17. A method for calculating a floating point add/subtract of a plurality of operands comprising the steps of:
providing the plurality of operands to a plurality of pairs of data paths;
in each pair of data paths, providing a pair of inputs to a first data path and a second data path;
in the first data path
providing one input of the pair of inputs to an aligner;
aligning the pair of inputs;
combining the pair of inputs to provide a first resultant;
detecting any leading zeroes of the first resultant;
providing the first resultant to a first normalizer capable of shifting a mantissa by a substantially smaller number of digits than the first aligner; and
normalizing the first resultant by shifting the mantissa of the first resultant left, thereby providing a normalized first resultant;
in the second data path
providing two digits of each exponent of the pair of inputs to a control logic block;
providing a control signal based on the two digits to a second aligner responsive to the control signal;
providing one of the pair of inputs to the second aligner;
aligning the pair of inputs using the control signal;
combining the aligned pair of inputs to provide a second resultant;
detecting any leading zeroes of the second resultant;
providing the second resultant to a second normalizer capable of shifting a mantissa a substantially larger number of digits than the second aligner; and
normalizing the second resultant by shifting the second resultant left, thereby providing a normalized second resultant.

18. The method of claim 17 wherein in the first data path, the step of providing one input of the pair of inputs to the first aligner comprises the steps of:
providing the pair of inputs to a comparer;
comparing the pair of inputs to determine which input is smaller; and
providing the smaller of the pair of inputs to a first aligner.

19. The method of claim 18 wherein the step of aligning the pair of inputs comprises the steps of:

aligning the smaller of the pair of inputs to the larger of the pair of inputs by equalizing the exponents of the pair of inputs; and
shifting the mantissa of the smaller of the pair of inputs right.

20. The method of claim 19 further comprising the steps of:
choosing the normalized first resultant if the pair of inputs are more than a first predetermined number of digits apart; and
choosing the normalized second resultant if the pair of inputs are less than the first predetermined number of digits apart.

21. The method of claim 17 further comprising the steps of:
choosing the normalized first resultant if the pair of inputs are more than a first predetermined number of digits apart; and
choosing the normalized second resultant if the pair of inputs are less than the first predetermined number of digits apart.

22. A method for calculating a floating point add/subtract of a pair of operands comprising the steps of:
providing a pair of operands to a first data path and a second data path;
in the first data path
providing one operand to an aligner;
aligning the pair of operands;
combining the aligned pair of operands to provide a first resultant;
detecting any leading zeroes of the first resultant;
providing the first resultant to a first normalizer capable of shifting a mantissa by a substantially smaller number of digits than the first aligner; and
normalizing the first resultant by shifting the mantissa of the first resultant left, thereby providing a normalized first resultant;
in the second data path
providing two digits of each exponent of the pair of operands to a control logic block;
providing a control signal based on the two digits to a second aligner responsive to the control signal;
providing one of the pair of operands to the second aligner;
aligning the pair of operands using the control signal;
combining the aligned pair of operands to provide a second resultant;
detecting any leading zeroes of the second resultant;
providing the second resultant to a second normalizer capable of shifting a mantissa a substantially larger number of digits than the second aligner; and
normalizing the second resultant by shifting the second resultant left, thereby providing a normalized second resultant.

23. The method of claim 22 wherein in the first data path, the step of providing one operand of the pair of operands to the first aligner comprises the steps of:
providing the pair of operands to a comparer;
comparing the pair of operands to determine which operand is smaller; and
providing the smaller of the pair of operands to a first aligner.

24. The method of claim 23 wherein the step of aligning the pair of operands comprises the steps of:
aligning the smaller of the pair of operands to the larger of the pair of operands by equalizing the exponents of the pair of operands, and shifting the mantissa of the smaller of the pair of operands right.

25. The method of claim 24 further comprising the steps of:

choosing the normalized first resultant if the pair of inputs are more than a first predetermined number of digits apart; and choosing the normalized second resultant if the pair of inputs are less than the first predetermined number of digits apart.

26. The method of claim 22 further comprising the steps of:

choosing the normalized first resultant if the pair of inputs are more than a first predetermined number of digits apart; and choosing the normalized second resultant if the pair of inputs are less than the first predetermined number of digits apart.

* * * * *